May 18, 1971 YASUHIRO OSHIMA 3,579,398
METHOD OF CURLING THERMOPLASTIC RESIN FILM INTO PIPES
AND CONSTRUCTING UPHOLSTERY THEREWITH
Filed July 23, 1968 3 Sheets-Sheet 1
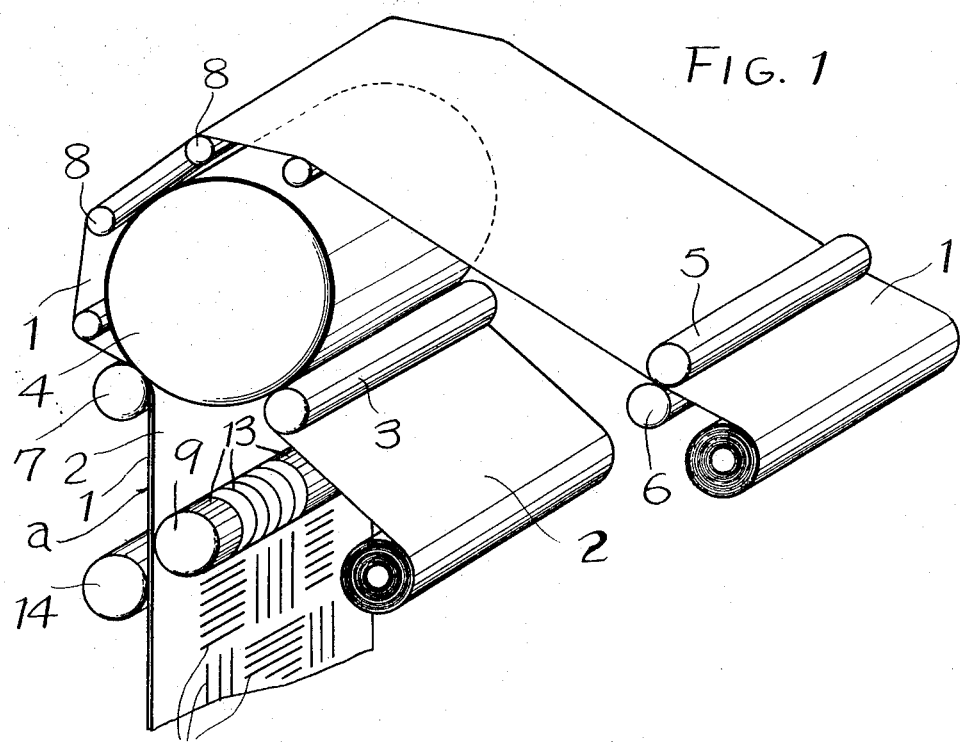
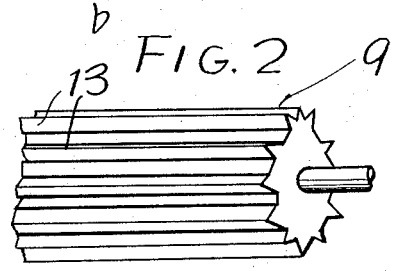
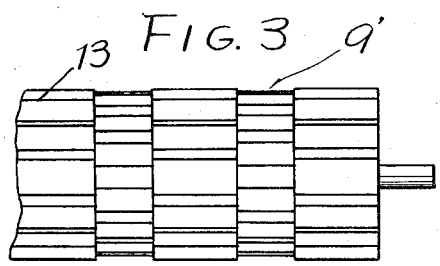
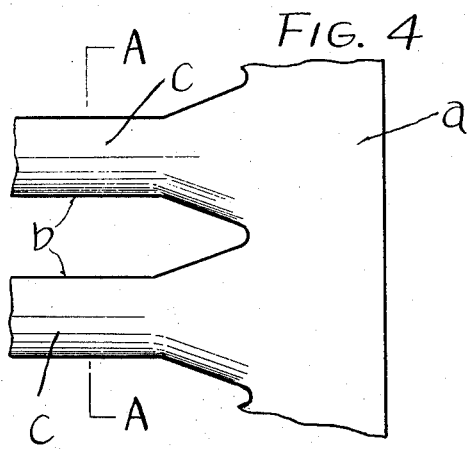
INVENTOR
YASUHIRO OSHIMA
ATT.

May 18, 1971 YASUHIRO OSHIMA 3,579,398
METHOD OF CURLING THERMOPLASTIC RESIN FILM INTO PIPES
AND CONSTRUCTING UPHOLSTERY THEREWITH
Filed July 23, 1968 3 Sheets-Sheet 2
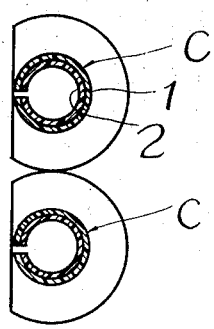
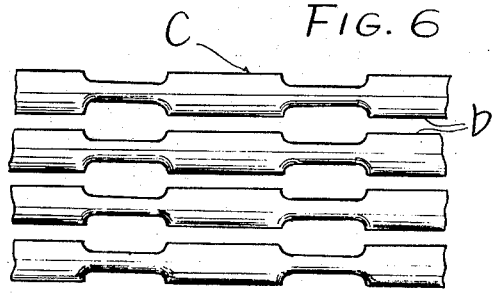
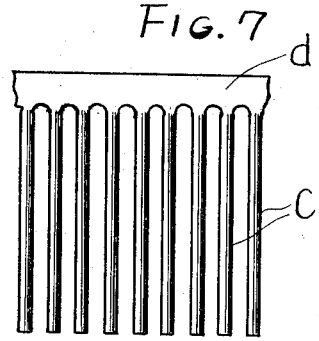
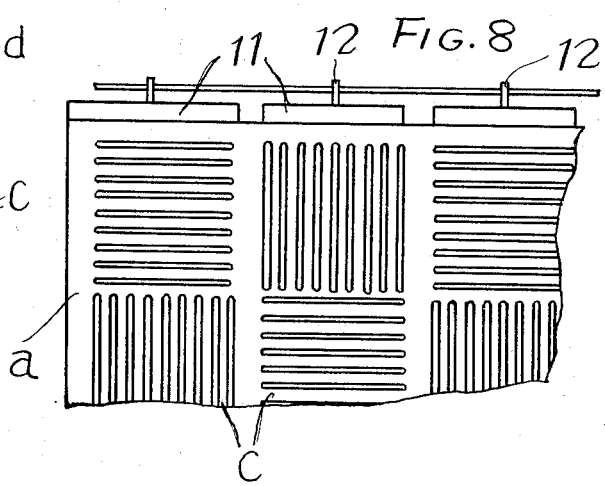
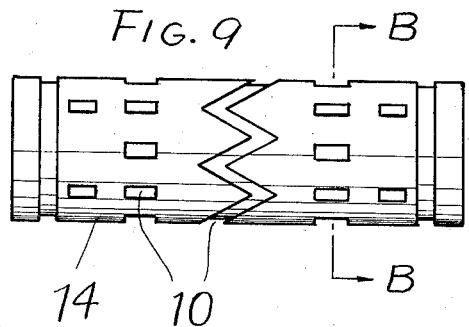
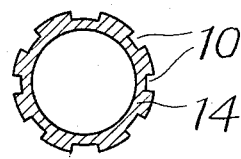
INVENTOR
YASUHIRO OSHIMA
BY
ATT.

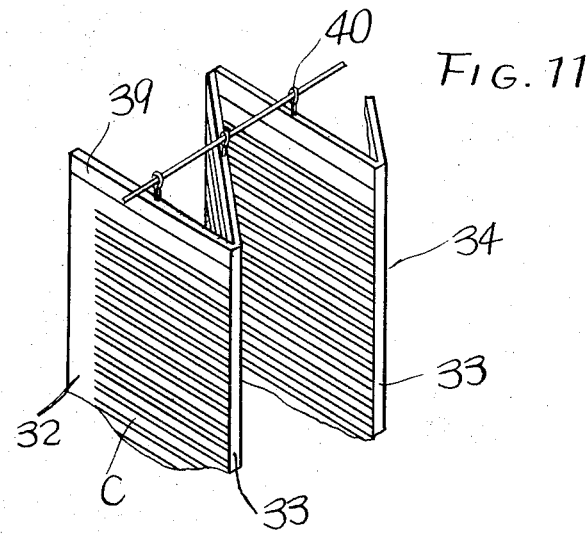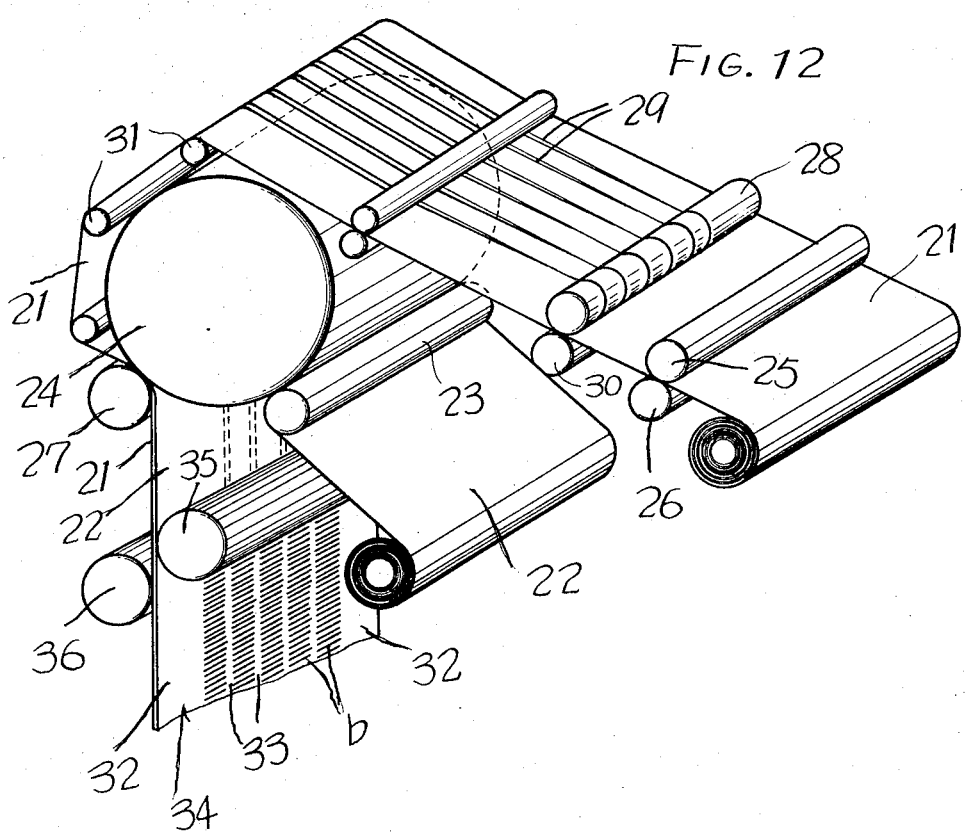

United States Patent Office 3,579,398
Patented May 18, 1971

3,579,398
METHOD OF CURLING THERMOPLASTIC RESIN FILM INTO PIPES AND CONSTRUCTING UPHOLSTERY THEREWITH
Yasuhiro Oshima, 860 Kashida, Hagasiosaka, Osaka Prefecture, Japan
Filed July 23, 1968, Ser. No. 746,878
Int. Cl. B32b *31/00*
U.S. Cl. 156—250                                       4 Claims

ABSTRACT OF THE DISCLOSURE

Method of forming a decorative plastic material in which a thin plastic material is thermally expanded and sealed to another thin plastic material on a heated surface of a rotary cylinder to form a single laminated plastic film, which is simultaneously notched with a desired number of decorative patterns so that the notched portions are curled to the side of the plastic material thereby supplying ornamental parts faster, easier and more economically, than prior art methods.

---

The present invention is related to a method of curling synthetic resin film into pipe-like shape and also to use of such pipes in upholstery and the like.

The principal objective of this invention is improvement of the method of producing pipes from thermoplastic resin film. The second objective of the invention is to enable a continuous pipe to be partially changed in diameter at different places. The third objective of the invention is to employ a plurality of the formed pipes as the edging fringes of interior furniture. The fourth objective of the invention is to employ the pipes in various combinations in upholstery, such as for example, as curtain, blind, tablecloth, doily, tablescarf or the like. A fifth objective is to employ such pipes when collapsible in lengthwise dimension in such curtain, blind and similar upholstery.

The present invention takes advantages of the thermoelasticity peculiar to synthetic resin materials. Namely, it is known that provided one of two sheets of thermoplastic film, such as vinyl chloride resin, is expanded at a temperature of about 80° C. to 90° C., and pressed to adhere with heat, to another sheet of the film, at a temperature of about 120° C. to 130° C., then the jointed or united sheet of the films curl up the side of the film on which is located the expanded sheet. However, such a method has not yet been explored or used to date, as to curl the thermo-plastic film and obtain pipe-like shapes by applying the above mentioned characteristic.

According to the method of this invention, any desired portions of the film can be formed into pipes and as a result it is possible to obtain upholstery like frill, curtain or blind without difficulty in attainment of the preceding objectives. In the prior art, upholstery of conventional type is usually made from synthetic resin materials. For instance, a blind may be manufactured in such a manner that vinyl chloride or the like is formed into pipes. These pipes are knitted with thread by means of a knitting machine at suitable intervals, e.g., 70 mm. Then, a reinforcement is applied to both edges of the blind. However, this is like the bamboo blind and its process is complex.

Furthermore, the existing blinds are generally composed of either bamboo splits or synthetic resin pipes knitted with thread. Therefore, the designs of the prior art blinds are only modifiable by using different yarn count, changing the knitting interval of the pipes or giving different colors to the limited designs. The knitting of these bamboo splits or synthetic resin pipes is only possible when they are linear in shape. The designs produced on the blinds are simple, lack variety and usually inartistic.

The present invention has suceeded in eliminating the monotony of prior art designs by making it possible to form the thermoplastic resin film into the pipes of same or partially different diameter by use of the property peculiar to the film whereby upholstery or the like ornamented with these pipes can be produced in a simple manner. The invention is explained in this specification in connection with the accompanying drawing, in which:

FIG. 1 is a perspective view illustrating one embodiment adapted to form pipes in accordance with the invention;

FIG. 2 is a perspective view partially showing a cutting roll;

FIG. 3 is a front view showing a part of another type of a cutting roll;

FIG. 4 is a plan view partially showing the condition of the film which is curled to form pipes and produce openings therebetween after having been trimmed with the cutting roll shown in FIG. 3;

FIG. 5 is a partial cross-section taken along line A—A of FIG. 4;

FIG. 6 is a plan view partially showing the condition of the film which has been curled to form pipes and openings in each of its cutting lines by use of the cutting roll shown in FIG. 3;

FIG. 7 is a plan view partially showing edge fringes;

FIG. 8 is a plan view showing a part of a blind;

FIG. 9 is a front view illustrating an embodiment including a roll corresponding to the cutting roll of FIG. 3;

FIG. 10 is is cross-section taken along line B—B of FIG. 9;

FIG. 11 is a perspective view partially showing a curtain or blind which is made collapsible lengthwise thereof from positions held suspended; and FIG. 12 is a perspective view showing a sample of the process of the curtain or blind.

In the accompanying drawing, reference numeral 1 designates a sheet of vinyl chloride film about 0.2 mm. thick. Reference numeral 2 designates a sheet of similar vinyl chloride film about 0.5 mm. thick. The film 2 is adhered through a rubber roll 3 to a drum 4 which is heated to about 140° C., with steam or other suitable heat source. Rolls 5 and 6, used to expand film 1, rotate at about ten percent lower linear velocity than that of the drum's 4 surface. Film 1 is maintained heated and expanded at about 80° C. to 90° C., from the time it is transferred upon the surface of the drum 4 until it reaches the place where a pressing rubber roll 7 abuts against the drum surface. Guide rolls 8 are provided at suitable intervals to supportedly transfer the film 1. Thus, the film 1 can be heated at about 80° C. to 90° C. and then expanded.

Film 2 is heated to about 120° C. to 130° C. upon the surface of drum 4. Films 1 and 2 then are hot-pressed to adhere to each other. This jointed or united sheet of the film *a* is incised with section lines by means of cutting roll 9 having knife-edges as is shown in FIG. 2, and the engaging roll 14 provided in opposition thereto. Film 1 commences to shrink from each incised section line *b*. Each portion between the section lines *b—b* gradually curls to form pipes *c* as the temperature becomes about 30° C. to 40° C. after about an hour, or later. The portion or connecting area which is not incised by section line *b* remains free of curling. After the curling stabilizes, there is no additional change in film 1.

The cutting roll 9 may have knife-edges of different intervals and shapes as shown in FIG. 3, in order to incise film 1 with section line *b*. In this manner the pipes of different shapes and diameter can be obtained at different locations.

As shown in FIG. 6, the pipe may be varied in shape at desired portions. Thus, it is possible to produce patterns and products rich in esthetic designs. Moreover, this method has wide application. Any modification of the pipe shape is possible by merely changing the position of the section lines *b*.

The edge fringes provided in accordance with this invention can be understood with reference to FIG. 7. The edges of the pipes *c* formed on the combined film *a* which is shown partially in FIGS. 4 and 6, and connecting area *d* of pipes *c* may be trimmed to suitable sizes. The pipes *c*, having suitably trimmed edges and connecting areas, can be used as ornamental fringes for interior furniture. The connecting area *d* can be trimmed to have a slightly larger length, and then easily adhered or stitched at the extra length to the edge of the furniture.

The Fourth objective of the invention which aims at obtaining upholstery like a curtain, blind, tablecover, doily, tablescarf or the like can be realized when the section lines *b* are imprinted on the combined film *a* by means of cutting rolls 9 and 9'. The long piece partially forming the pipes *c* may be cut in to suitable lengths, either the upper portion or the lower portion of which is then supplied with a reinforcement 11 and a suspending piece 12 as shown in FIG. 8. Roll 14 corresponding to cutting roll 9 may be shaped to form notches 10 of zigzag, square or any other shape. The notches 10 are free from pressure. Thus, the portion of the film *a* abutting thereon is left intact. Therefore, although cutting roll 9 may be of one design, it is possible to apply the section lines *b* freely to film *a* by means of roll 14, whose surface is provided with notches 10 of varied shapes. Furthermore, each portion of film *a* occupied between section lines *b—b* is curled into pipes *c* so that any desired design is obtainable by use of pipes *c* and connecting areas *d*.

Turning now to FIG. 12, which depicts means for obtaining interior furniture like curtain or blind composed of pipes *c* and being lengthwise collapsible in suspended panels as shown in FIG 11. Reference numeral 21 designates a sheet of vinyl chloride film about 0.05 mm. thick and numeral 22 denotes a sheet of vinyl chloride about 0.15 mm. thick. At numeral 23 is shown a rubber roll for adhering film 22 closely to a heating drum 24 which is heated to about 140° C. with heated steam or other heat source and rotates at the rate of about 1.5 meter per minute. Rolls 25 and 26, used for expanding film 21, are provided in each opposed relation and rotate at the rate of about 1 meter per minute. Film 21 is heated to about 80° C. to 90° C. and expanded until it reaches the point where the pressing rubber roll 27 abuts against heating drum 24. Film 21 is incised in parallel to the direction of its movement by means of a rotary cutter 28, which has knives or cutters at desired intervals, and provided in the following location with rolls 25 and 26. A roll 30 is provided against the rotary cutter 28. A guide roll 31 is provided at a suitable distance from the periphery of drum 24.

Film 21 is cut along incision 29, at desired intervals, in parallel to the direction of its movement. Then, it is hot-pressed between both the expanding roll 25, and 26 and pressing rubber roll 27 so that the incision 29 grows wider while the film 21 is extended in length and grows narrower in width as it is moved along. Film 22 is heated to about 120° C. to 130° C. upon the surface of the drum 24, while at the same time the film 21 is cut with the incision 29. The two sheets of the film are hot-pressed and adhered to each other by means of the pressing rubber roll 27. This produces a jointed or combined sheet of film 34 composed of a two layer film 32 comprising films 21 and 22, in parallel to the direction of movement thereof, and also a single layer film 33 comprising only film 22.

The combined sheet 34 produced above is incised along section lines *b—b* at right angles to the direction of movement, between cutting roll 35, provided with cutters or knives at intervals of 8 mm., and a mild steel roll 37 placed at the opposite side of cutting roll 35. The construction of the cutting roll may be varied to vary the section line incisions. The combined sheet 34 is incised along section lines *b—b* and after cooling and passage of time, the incision portions are curled into pipes *c*. After stabilization of the pipes, there is no further change. Pipes *c* and connecting areas *d* are able to produce a variety of refined designs and serve as reinforcement of furniture at the same time. The long piece of pipe *c* obtained in this manner may be trimmed to any suitable length and either its upper portion or lower portion may be provided with a collapsible reinforcement 39 and a suspending means 40, thereby making it possible to construct the blind or curtain shown in FIG. 11. Furthermore, it is also possible to use the long piece of pipe *c* as material for tablecloth, doily, or tablescarf, but suitable cutting would be required. The curtain or blind constructed with the material produced by this inventions is of solid quality because the pipe *c* is formed in two layers. The connecting area *d* of each pipe *c* as is shown at the right and left of FIG. 11, is of mild quality because it is formed in a single layer 33. Thus, it is possible to fold the curtain or blind lengthwise along this connecting area when it is suspended as shown.

Other varied designs may be produced by color printing, embossing, etc, of the films 2, and 21, during the process.

The present invention employs to advantage, the features of thermoplastic resin films. In addition to vinyl chloride resin, other thermoplastic resin materials may be used, such as for example, synthetic resin such as polypropylene resin, and high pressure polyethylene resin. This invention is not to be restricted or limited to the disclosure in the specification since it is only illustrative of the invention and not restrictive thereof.

What is claimed is:

1. Method of curling decorative strip portions of a laminated thermoplastic resin film, comprising the steps of
 (a) winding a first thin thermoplastic resin sheet material around a heated peripheral surface of a rotary cylinder;
 (b) heating said first material to cause said first material to be sealable to a second thin thermoplastic resin sheet material;
 (c) expanding by heating to a temperature of less than 100° C., said second material;
 (d) thermally sealing said first material to the expanded said second material;
 (e) providing a desired number of suitably spaced decorative notches to the resulting laminated thermoplastic resin film; and
 (f) cooling said laminated film to enable the decorative strip portions to curl between said notches.

2. Method of claim 1, wherein said decorative notches are each square in shape.

3. Method of claim 1, wherein said strip portions are substantially cut in transverse relation.

4. Method of curling decorative strip portions of a laminated thermoplastic resin film, comprising the steps of
 (a) winding a first thin plastic material about a heated peripheral surface of a rotary cylinder;

(b) heating said first material to cause said first material to be sealable to a second plastic material;
(c) cutting areas of said second material sealable to said first material in direction of movement of said second material, at suitable spaced intervals;
(d) expanding a plurality of the cut plastic material by heating at a temperature below 100°C.;
(e) thermally sealing said plurality of expanded plastic materials at suitably spaced intervals to said second material; and
(f) cutting a desired number of decorative notches to portions of the thermally sealable material; and
(g) cooling said material having said notches to enable said decorative strip portions to curl between said notches.

References Cited

UNITED STATES PATENTS

| | | | |
|---|---|---|---|
| 2,052,151 | 8/1936 | Van Voorhis | 156—271 |
| 2,166,819 | 7/1939 | Miller | 156—271 |
| 2,688,582 | 9/1954 | Phair et al. | 156—253 |
| 3,221,738 | 12/1965 | Ekberg et al. | 156—252X |
| 3,458,385 | 7/1969 | Bova et al. | 156—252X |

BENJAMIN A. BORCHELT, Primary Examiner

D. A. BENT, Assistant Examiner

U.S. Cl. X.R.

156—83